Aug. 20, 1929.　　R. J. WINTERBOTTOM　　1,724,985
PISTON AND PISTON PIN
Filed Nov. 16, 1927
Fig. 1.
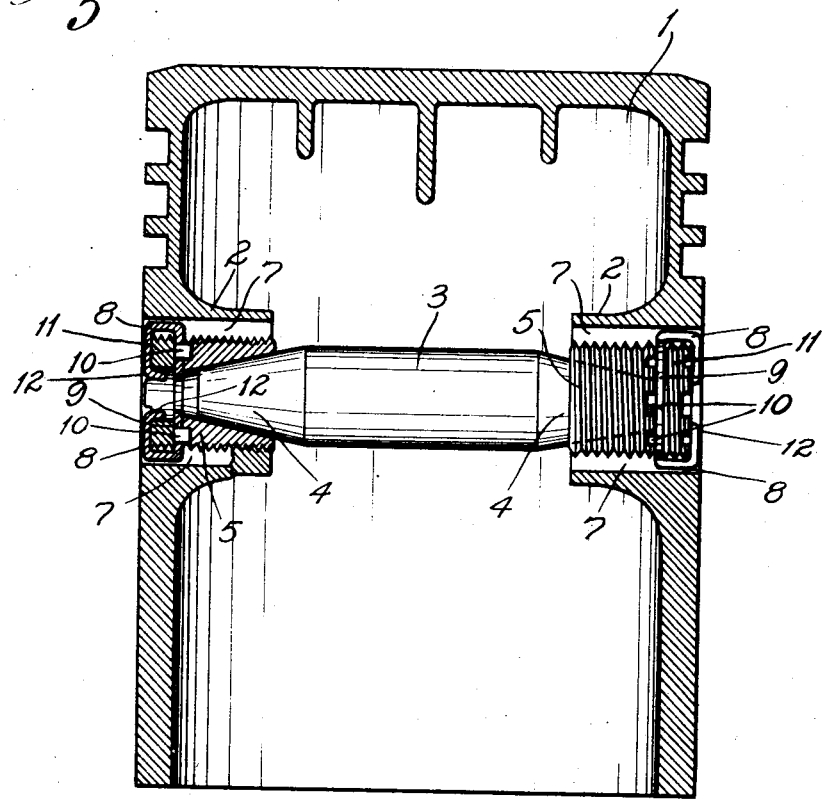
Fig. 2.
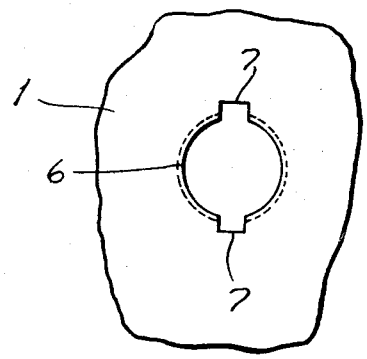
Fig. 3.
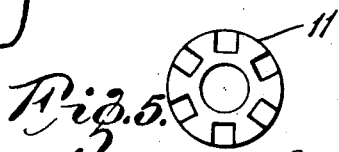
Fig. 4.
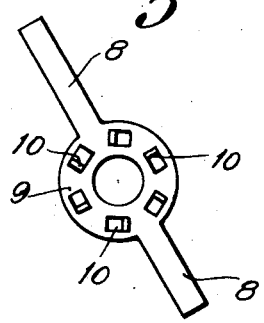
Fig. 5.
INVENTOR:
RALPH J. WINTERBOTTOM.
BY W. L. Dempsey
ATTORNEY.

Patented Aug. 20, 1929.

1,724,985

UNITED STATES PATENT OFFICE.

RALPH J. WINTERBOTTOM, OF SPARTA, ILLINOIS.

PISTON AND PISTON PIN.

Application filed November 16, 1927. Serial No. 233,601.

My invention relates to piston pins, and particularly to piston pins used in pistons of the trunk type, i. e. pistons in which the piston itself acts as a crosshead, so that the connecting rod is limited in its rotative motion about the piston pin.

The primary object of my invention is to provide means for taking up the natural and ordinary wear or looseness occasioned by wear in the end bearings of the piston.

This and other objects of my invention will be clearly disclosed in the specification, claim and drawings, in which:

Fig. 1 is a transverse vertical section of a piston showing the use of my improved pin.

Fig. 2 is a side view of the piston pin opening in the piston.

Fig. 3 is an end view of the bushing.

Fig. 4 is a plan view of the lock washer.

Fig. 5 is a plan view of the lock nut used in connection with my improved piston pin.

Practically all combustion engines are made with trunk type pistons in order to avoid the necessity of crossheads and crosshead guides, hence the piston pin becomes a pivot point about which the connecting rod rotates, to a limited extent, with each revolution of the crankshaft. As combustion engines, especially those used for automotive purposes, rotate at very high speeds, the piston pin naturally rapidly wears away its bearings, not only because of the high speed of the engine, but because of the excessive pressure exerted by the exploding gas.

The result of this condition is that the piston pin becoming loose in its bearings sets up a clattering noise in the engine, which is not only disagreeable but causes the piston to tend to rotate about a point intermediate of the ends of the piston pin, resulting in unusual wear upon the piston.

To avoid these objections I have devised a piston pin in which the wear can be taken up without removing the bushing or re-boring the bearing. My preferred method of construction is shown in Fig. 1, in which 1 indicates the piston, of the usual type used in combustion engines, provided with inwardly projecting bosses 2 and piston pin 3, the ends 4 of which are slightly tapered, the taper being exaggerated in the drawing for illustrative purposes.

A removable bushing 5, which may be made of phosphor-bronze, or any other suitable bearing metal has a like taper with the piston pin and is screw-threaded into the bosses 2, so that it may be screwed into and out of the bosses for the purpose of adjusting the piston pin with the proper clearance to prevent looseness of the pin and at the same time may be regulated to a close bearing fit.

As the bushing 5 would naturally tend to rotate with the piston pin, the opening 6 in the piston 1 into which the bushing 5 is screwed, is provided on diametrically opposite sides with key seats 7 into which the extended ends 8 of the washer 9 fit after the washer 9 has been put in place and the extended ends turned at right angles to the plane of the face of the washer.

The end of the bushing 5, as shown in Fig. 3, is castellated, like and opposite castellations 10, shown in Fig. 4, of the washer fitting in between the castellations on the end of the bushing 5 to prevent its rotation.

To further secure the bushing against working loose, a lock nut 11, shown in Fig. 5, is provided, one side of which is smooth adapted to be screwed taut up against the outer surface of the lock washer 9, its opposite side being castellated so that the extended ends 8 of the lock washer may be bent over at 12, as shown in Fig. 1, between the castellation points so that it is impossible for the bushing, washer or lock nut to rotate once secured in place.

The castellations on both the end of the bushing and the lock nut permit the bushing to be screwed in and out with a specially designed tool to fit them.

Having fully described my invention, what I claim as new and useful and desire to secure by Letters Patent is:

A piston and piston pin of the class described, comprising a piston having oppositely disposed inwardly protruding bosses, said bosses having straight, screw-threaded bores therethrough and longitudinal oppositely disposed key seats therein, externally screw-threaded bushings adapted to fit in said bores, said bushings being taper bored through and through, a piston pin having tapered ends adapted to fit and rotate in said taper bored bushings, said bushings having their outer ends castellated, a castellated washer adapted to engage and fit the castellations in said bushings, oppositely disposed splines integral with and projecting outwardly from the periphery of said washer capable of being bent at a rightangle to the face of said washer and adapted to fit in said key seats, a castellated lock nut externally screw-threaded adapted to fit in the screw-threaded bores in said bosses.

In witness whereof I have hereunto affixed my signature this 1st day of November, 1927.

RALPH J. WINTERBOTTOM.